US012412500B2

(12) United States Patent
Chen et al.

(10) Patent No.: US 12,412,500 B2
(45) Date of Patent: Sep. 9, 2025

(54) DISPLAY PANEL

(71) Applicant: TCL CHINA STAR OPTOELECTRONICS TECHNOLOGY CO., LTD., Guangdong (CN)

(72) Inventors: Xinhong Chen, Shenzhen (CN); Youngil Ban, Shenzhen (CN)

(73) Assignee: TCL CHINA STAR OPTOELECTRONICS TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 18/401,533

(22) Filed: Dec. 31, 2023

(65) Prior Publication Data

US 2025/0218324 A1 Jul. 3, 2025

(30) Foreign Application Priority Data

Dec. 11, 2023 (CN) ......................... 202311702831.9

(51) Int. Cl.
*G09G 3/20* (2006.01)

(52) U.S. Cl.
CPC ..... *G09G 3/2003* (2013.01); *G09G 2310/021* (2013.01); *G09G 2310/0267* (2013.01); *G09G 2310/0286* (2013.01); *G09G 2340/0414* (2013.01)

(58) Field of Classification Search
CPC ........... G09G 3/2003; G09G 2310/021; G09G 2310/0267; G09G 2310/0286; G09G 2340/0414; G09G 3/3266; G09G 3/20; G09G 2310/08; G09G 3/3677; G09G 2300/0426; G09G 2300/0408; G09G 3/3233; G09G 3/3225; G09G 3/3674; G09G 3/3648; G09G 3/3275; G09G 2310/0264
See application file for complete search history.

(56) References Cited

U.S. PATENT DOCUMENTS

| | | | | |
|---|---|---|---|---|
| 10,891,886 B2 * | 1/2021 | Mi | ........................ | G09G 3/3677 |
| 2019/0066560 A1 * | 2/2019 | Mi | .......................... | G11C 19/28 |
| 2023/0129625 A1 * | 4/2023 | Liu | ...................... | G09G 3/3677<br>345/214 |
| 2023/0230527 A1 * | 7/2023 | Chung | ................... | G09G 3/342<br>345/699 |

* cited by examiner

*Primary Examiner* — Sujit Shah
(74) *Attorney, Agent, or Firm* — PV IP PC; Wei Te Chung

(57) ABSTRACT

A display panel includes: multiple pixel rows including multiple odd-numbered pixel rows and multiple even-numbered pixel rows arranged alternately in sequence in a column direction, each of the pixel rows including three adjacent sub-pixel rows; multiple data lines, each of the data lines being connected to a sub-pixel column of the display panel; multiple scan lines, each of the scan lines being connected to one of the sub-pixel rows; and a gate drive circuit connected to the plurality of scan lines.

13 Claims, 14 Drawing Sheets

DISPLAY PANEL

CROSS-REFERENCE TO RELATED APPLICATION

This application claims the priority to Chinese Application No. 202311702831.9, filed on Dec. 11, 2023, the contents of which are incorporated herein by reference in their entirety.

FIELD

The present disclosure relates to display technologies, and more particularly, to a display panel.

BACKGROUND

Dual Line Gating (DLG) technique is a variable resolution technique that can achieve cost and/or power reduction by reducing the effective resolution. For example, a display panel having a resolution of 4K*2K may be displayed at an effective resolution of 4K*1K.

However, the Dual Line Gating technique is difficult to implement in display panels of different drive architectures.

SUMMARY

According to one or more embodiments of the present disclosure, a display panel includes: multiple pixel rows including multiple odd-numbered pixel rows and multiple even-numbered pixel rows arranged alternately in sequence in a column direction, each of the pixel rows including three adjacent sub-pixel rows; multiple data lines, each of the data lines being connected to a sub-pixel column of the display panel; multiple scan lines, each of the scan lines being connected to one of the sub-pixel rows; and a gate drive circuit connected to the multiple scan lines, the gate drive circuit including: a first gate drive group connected to a first odd-numbered pixel row of the odd-numbered pixel rows through 3 scan lines of the scan lines; a second gate drive group connected to a first even-numbered pixel row of the even-numbered pixel rows through 3 scan lines of the scan lines; at least one third gate drive group, each of the third gate drive groups being connected to an other odd-numbered pixel row of the odd-numbered pixel rows through 3 scan lines of the scan lines; and at least one fourth gate drive group, each of the fourth gate drive groups being connected to an other even-numbered pixel row of the even-numbered pixel rows through 3 scan lines of the scan lines. In a first mode, the first gate drive group, the second gate drive group, the third gate drive group, and the fourth gate drive group are cascaded to scan a different sub-pixel row each time; or, in a second mode, the first gate drive group and the third gate drive group are cascaded, the second gate drive group and the fourth gate drive group are cascaded, the first gate drive group and the second gate drive group respectively synchronously scan the first odd-numbered pixel row and the first even-numbered pixel row, and the third gate drive group and the fourth gate drive group respectively synchronously scan the second odd-numbered pixel row and the second even-numbered pixel row.

According to one or more embodiments of the present disclosure, a display panel includes: multiple pixel columns including a plurality of odd-numbered pixel columns and multiple even-numbered pixel columns arranged alternately in sequence in a row direction, each of the pixel columns including three adjacent sub-pixel columns; multiple data lines, each of the data lines being connected to a sub-pixel row of the display panel; a data driver connected to the data lines and disposed in an arrangement direction of the pixel columns; multiple scan lines, each of the scan lines being connected to one of the sub-pixel columns; and a gate drive circuit disposed in an extension direction of the pixel columns and connected to the plurality of scan lines, the gate drive circuit including: a first gate drive group connected to a first odd-numbered pixel column of the odd-numbered pixel columns through 3 scan lines of the scan lines; a second gate drive group connected to a first even-numbered pixel column in the row direction of the even-numbered pixel columns through 3 scan lines of the scan lines; at least one third gate drive group, each of the third gate drive groups being connected to an other odd-numbered pixel column in the row direction of the odd-numbered pixel columns through 3 scan lines of the scan lines; and at least one fourth gate drive group, each of the fourth gate drive groups being connected to an other even-numbered pixel column of the even-numbered pixel column s through 3 scan lines of the scan lines. In a first mode, the first gate drive group, the second gate drive group, the third gate drive group, and the fourth gate drive group are cascaded to scan a different sub-pixel column each time; or, in a second mode, the first gate drive group and the third gate drive group are cascaded, the second gate drive group and the fourth gate drive group are cascaded, the first gate drive group and the second gate drive group respectively synchronously scan the first odd-numbered pixel column and the first even-numbered pixel column, and the third gate drive group and the fourth gate drive group respectively synchronously scan the second odd-numbered pixel column and the second even-numbered pixel column.

BRIEF DESCRIPTION OF THE DRAWINGS

The technical solution and other beneficial effects of the present disclosure will be apparent from the following detailed description of specific embodiments thereof, taken in conjunction with the accompanying drawings.

DETAILED DESCRIPTION

The technical solution in the embodiments of the present disclosure will be clearly and completely described with reference to the accompanying drawings in which: It will be apparent that the described embodiments are only part of the examples of the present disclosure, and not all examples. Based on the embodiments in the present disclosure, all other embodiments obtained by a person skilled in the art without involving any inventive effort are within the scope of the present disclosure.

Furthermore, the terms "first" and "second" are used for descriptive purposes only and are not to be construed as indicating or implying relative importance or implicitly indicating the number of indicated technical features, such that the features defining "first" and "second" may explicitly or implicitly include one or more of the recited features, and in the description of the present disclosure, The term "multiple" is meant to mean two or more unless expressly and specifically defined otherwise.

Figure 1:
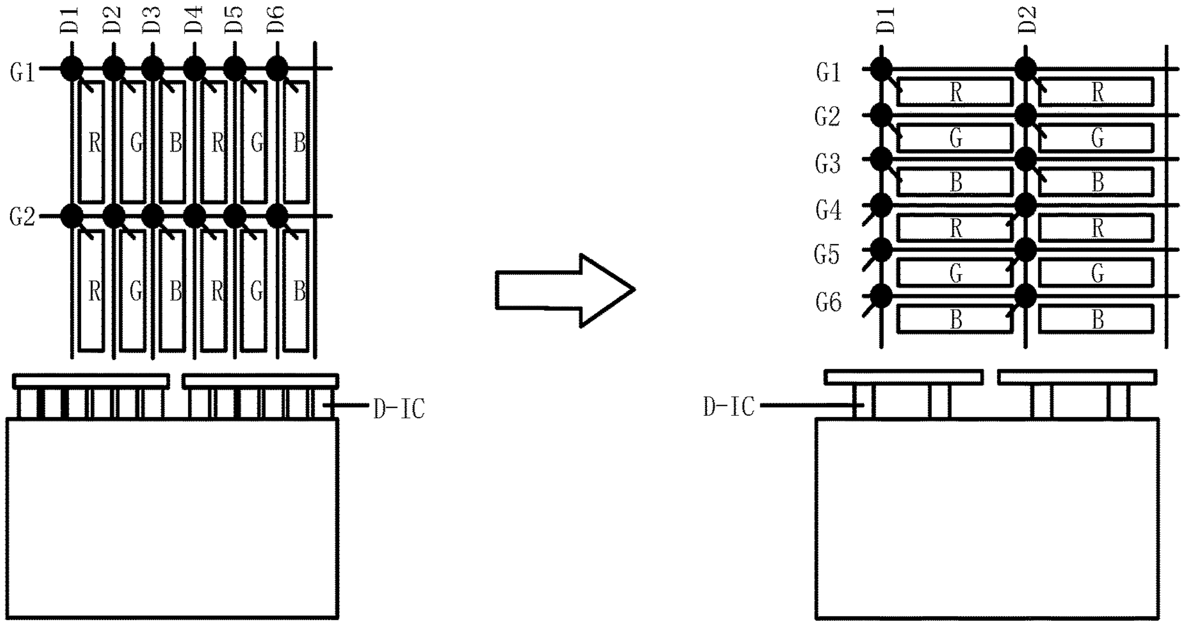
FIG. 1 is a schematic diagram of a comparison between structures of display panels of a related drive architecture and a tri-gate drive architecture.

As shown in FIG. 1, the drive architecture of 1G1D is shown to the right of the arrow, and the Tri-gate drive architecture is shown to the left of the arrow.

In the drive architecture of 1G1D, a resolution of 3840*3*2160 is used as an example, which requires 12 data drive chips (D-IC) each having 960 pins to provide a corresponding data signal. In FIG. 1, only two rows and six columns of sub-pixels are illustrated. Each of the scan lines G1/G2 is connected to a sub-pixel row, and each of the data lines D1/D2/D3/D4/D5/D6 is connected to a sub-pixel column. The red sub-pixel (R), the green sub-pixel (G) and the blue sub-pixel (B) in each pixel are horizontally arranged.

In the Tri-gate drive architecture, a resolution of 3840*3*2160 is taken as an example, which requires four data drive chips (D-IC) to provide a corresponding data signal. In FIG. 1, only six rows and two columns of sub-pixels are illustrated. Each of the scan lines G1/G2/G3/G4/G5/G6 is connected to a sub-pixel row, and each of the data lines D1/D2 is connected to a sub-pixel column. The red sub-pixel (R), the green sub-pixel (G) and the blue sub-pixel (B) in each pixel are vertically arranged.

The number of data lines of the Tri-gate drive architecture is reduced from 3840*3 to 3840 compared to the drive architecture of 1G1D. Since the number of data driver chips is also reduced by three times, the Tri-gate driver architecture is gradually becoming an important direction for the panel factory to reduce the cost.

Figure 2:
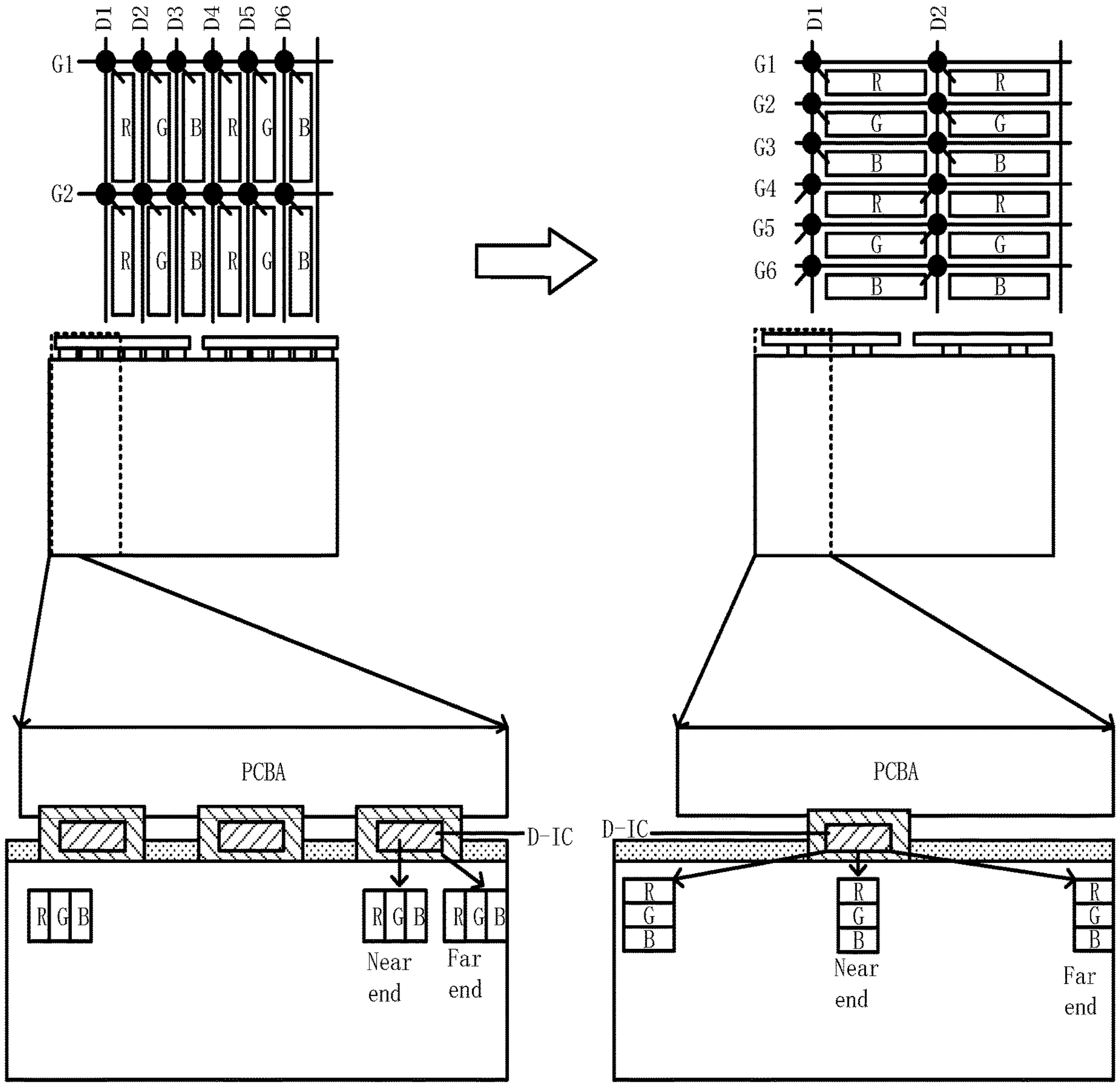
FIG. 2 is an enlarged view of a data drive chip and a circuit board of FIG. 1.

However, as shown in FIG. 2, since the number of data driver chips is also reduced by three times, the display area driven by a single data driver chip is also increased by three times, so that a distance from the data driver chip to a near end and a distance from the data driver chip to a far end are different, thereby causing the load to the near end and the load to the far end to also be different. The circuit board PCBA is connected to each data drive chip.

Figure 3:
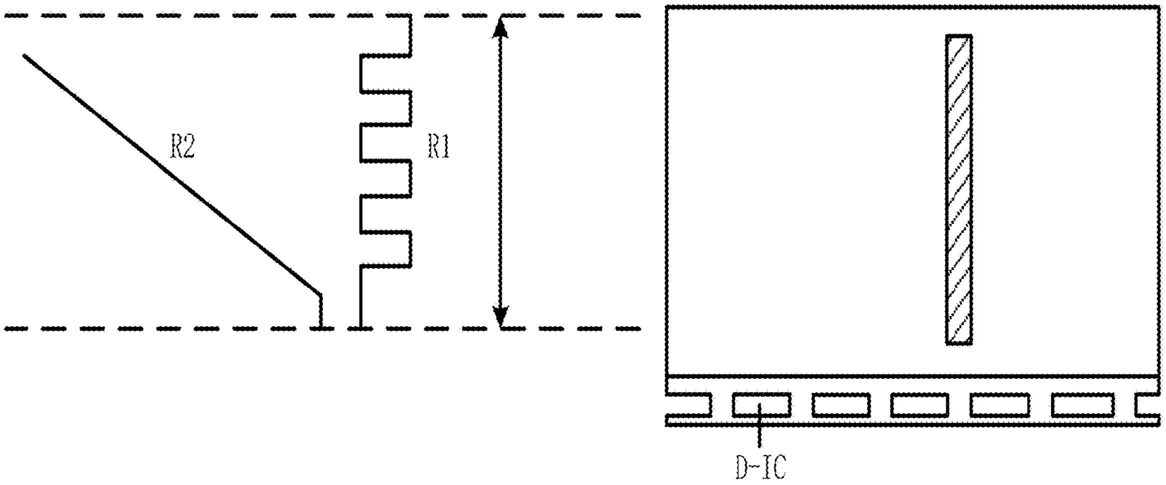
FIG. 3 is a schematic diagram of the cause of formation of a dark band in a related Tri-gate drive architecture.

As shown in FIG. 3, a width of a fan-out region (shown by double arrows in FIG. 3) is insufficient to meet requirements of the serpentine wiring (equal-length wiring), so that a wiring impedance R2 at the far end is different from a wiring impedance R1 at the near end. The difference causes a charging voltage difference, and further causes a vertical dark phenomenon, which may be a dark band, as shown by a frame filled with diagonal lines in FIG. 3. The dark band is also referred to as an uneven sector display.

Figure 4:
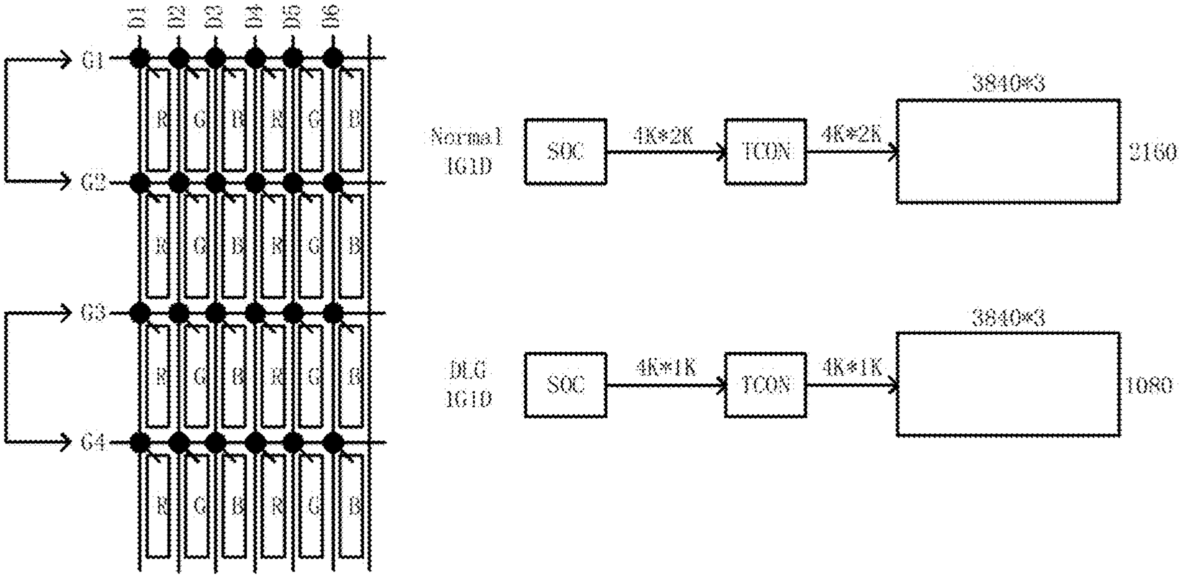
FIG. 4 is a schematic diagram of a manner in which a display panel of a 1G1D drive architecture implements the DLG technique.

In the drive architecture of 1G1D shown in FIG. 4, in a Normal mode, a system-on-chip (SOC) provides video data of 4K*2K resolution, a timing controller (TCON) receives and outputs the video data of 4K*2K resolution, the scan lines G1-G4 each scan each row of sub-pixels line by line, and the data lines D1-D6 each provide a corresponding data signal to drive a corresponding sub-pixel for display.

In the DLG mode, a system-on-chip (SOC) provides video data of 4K*1K resolution, a timing controller (TCON) receives and outputs the video data of 4K*1K resolution, and an odd-numbered sub-pixel row and an even-numbered sub-pixel row which are adjacent are synchronously scanned. For example, the scanning lines G1/G2 synchronously scan a first sub-pixel row and a second sub-pixel row, respectively, and the scanning lines G3/G4 synchronously scan a third sub-pixel row and a fourth sub-pixel row, respectively, so that the odd-numbered sub-pixel row and the even-numbered sub-pixel row display the same content, thereby realizing the DLG mode.

This is easy to implement DLG mode in the 1G1D drive architecture.

Figure 5:
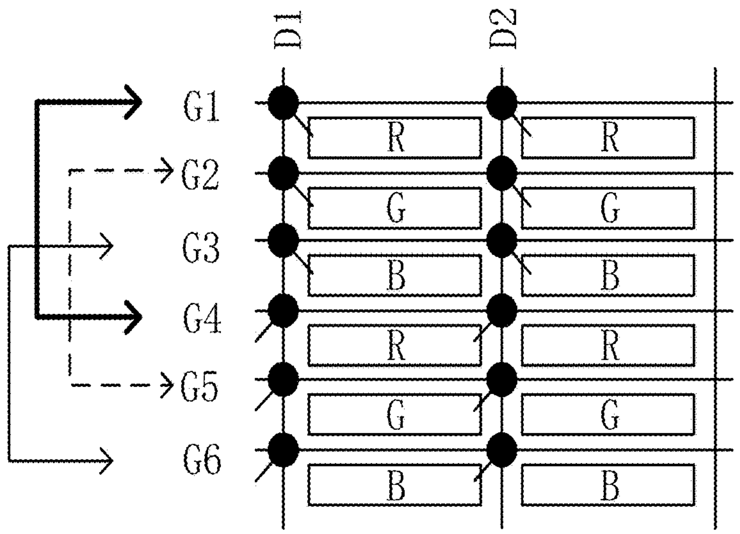
FIG. 5 is a schematic diagram of a display panel of an Tri-gate drive architecture according to one or more embodiments of the present disclosure.

However, the DLG mode is difficult to implement in the Tri-gate drive architecture. As shown in FIG. 5, the scan lines G1/G4 need to synchronously scan a first row of sub-pixels and a fourth row of sub-pixels, the scan lines G2/G5 needs to synchronously scan a second row of sub-pixels and a fifth row of sub-pixels, the scan lines G3/G6 need to synchronously scan a third row of sub-pixels and a sixth row of sub-pixels, and so on. Since the two rows of sub-pixels that need to be scanned synchronously are not adjacent, it is difficult to design on the drive circuit.

Figure 6:
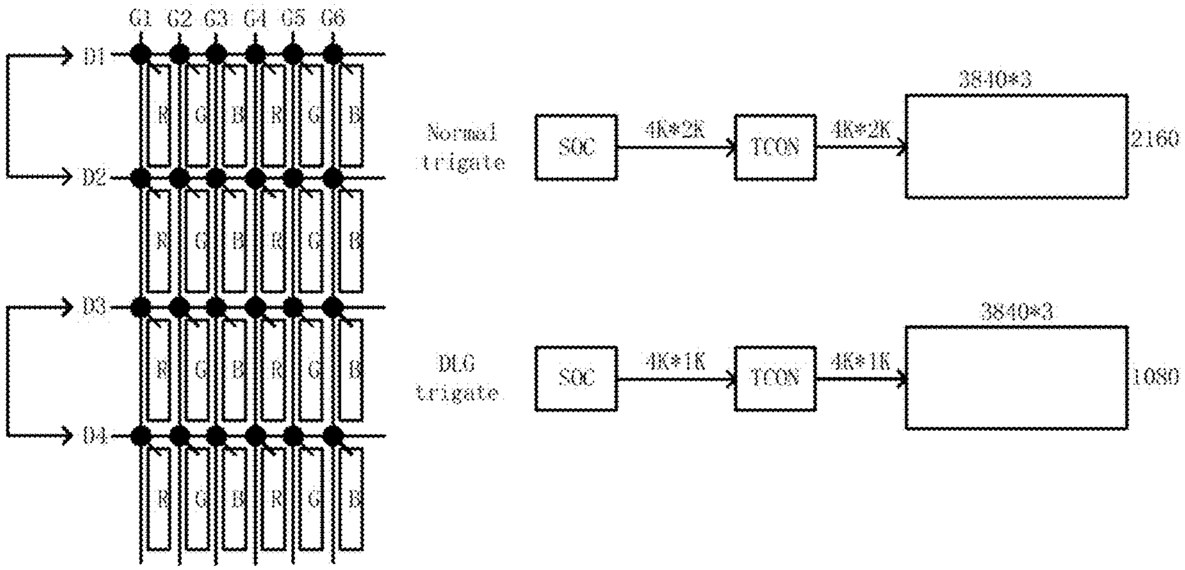
FIG. 6 is a schematic diagram of a manner in which a display panel of an Tri-gate drive architecture implements the DLG technique according to one or more embodiments of the present disclosure.

In FIG. 6, similar to implementing the DLG driving in the 1G1D drive architecture, scanning lines of the odd rows and scanning lines of the even rows need to be opened at the same time, so that a vertical resolution (4K*2K→4K*1K) can be reduced.

When implementing the DLG driving in the Tri-gate drive architecture, the TCON provides the same data to the data lines of the odd rows and the data lines of the even rows, and the SOC setting is consistent with the setting of the DLG implemented in the drive architecture of the 1G1D, so that the client can quickly use the technology.

Figure 7:
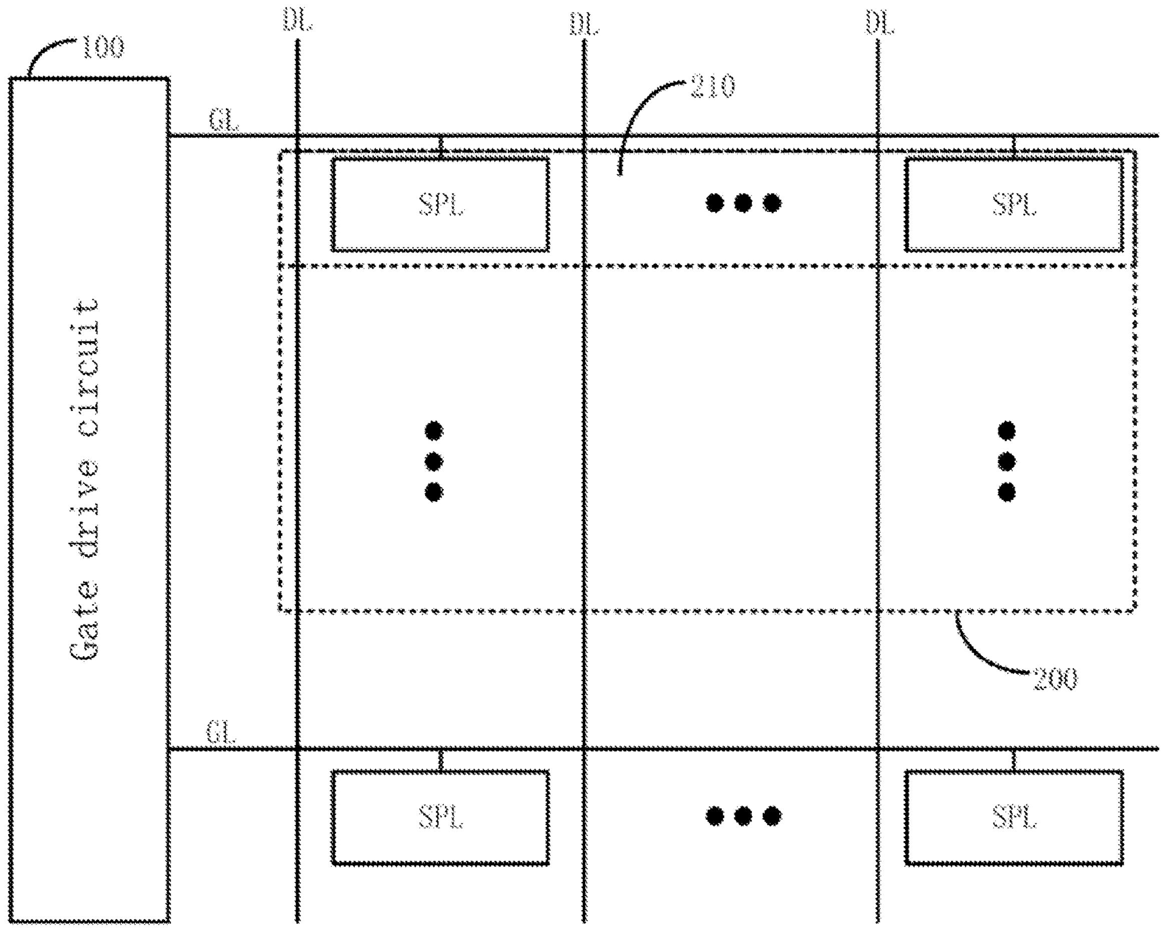
FIG. 7 is a schematic diagram of a first structure of a display panel according to one or more embodiments of the present disclosure.

One or more embodiments provides a display panel 1000. Referring to FIGS. 7 to 22, as shown in FIG. 7, the display panel 1000 includes multiple pixel rows 200, multiple data lines (DL), multiple scan lines (GL), and a gate drive circuit 100. The multiple pixel rows 200 includes multiple odd-numbered pixel rows 200 and multiple even-numbered pixel rows 200, which are sequentially arranged alternately in a column direction. Each pixel row 200 includes three adjacent sub-pixel rows 210. Each data line is connected to a corresponding sub-pixel column 310. Each scan line is connected to a sub-pixel row 210. The gate drive circuit 100 is connected to multiple scan lines.

Figure 9:
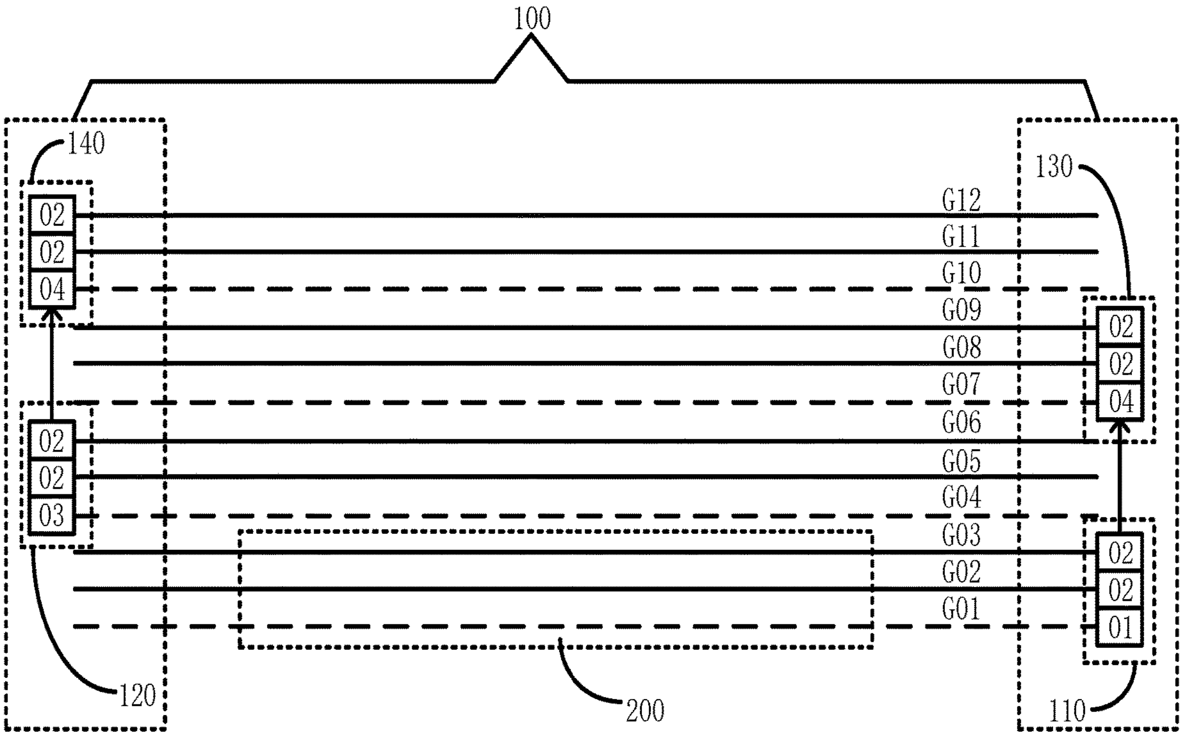
FIG. 9 is a schematic diagram of a third structure of a display panel according to one or more embodiments of the present disclosure.

In one or more embodiments, as shown in FIG. 9, the gate drive circuit 100 includes a first gate drive group 110, a second gate drive group 120, at least one third gate drive group 130, and at least one fourth gate drive group 140. The first gate drive group 110 is connected to a first odd-numbered pixel row 200 in a column direction through a corresponding scanning line; the second gate drive group 120 is connected to a first even-numbered pixel row 200 in the column direction through a corresponding scanning line; each third gate drive group 130 is connected to another odd-numbered pixel row 200 through a corresponding scanning line; and each fourth gate drive group 140 is connected to another even-numbered pixel row 200 through a corresponding scanning line. In the first mode, the first gate drive group 110, the second gate drive group 120, the third gate drive group 130, and the fourth gate drive group 140 are acceded in sequence to scan a different sub-pixel row 210 each time. Alternatively, in the second mode, the first gate drive group 110 and the third gate drive group 130 are acceded in sequence, and the second gate drive group 120 and the fourth gate drive group 140 are acceded in sequence. The first gate drive group 110 and the second gate drive group 120 respectively scan the first odd-numbered pixel row 200 and the first even-numbered pixel row 200 synchronously, and the third gate drive group 130 and the fourth gate drive group 140 respectively scan a second odd-numbered pixel row 200 and a second even-numbered pixel row 200 synchronously.

Note that the first odd-numbered pixel row 200 includes three adjacent sub-pixel rows 210 respectively connected to the scan lines G01/G02/G03. The first even-numbered pixel row 200 includes three adjacent sub-pixel rows 210 respectively connected to the scan lines G04/G05/G06.

Each of the third gate drive group 130 is connected to another odd-numbered pixel row 200 through corresponding scan lines, and the other odd-numbered pixel row 200 includes, for example, three adjacent sub-pixel rows 210 respectively connected to scan lines G07/G08/G09, and so on.

Each of the fourth gate drive group 140 is connected to another even-numbered pixel row 200 through corresponding scan lines, and the other even-numbered pixel row 200 includes, for example, three adjacent sub-pixel rows 210 respectively connected to scan lines G10/G11/G12, and so on.

It will be appreciated that in the display panel 1000 according to one or more embodiments, the gate drive circuit 100 scans a different sub-pixel row 210/column each time to implement the normal driving of the first mode having high resolution and low refresh frequency by row-by-row/column scanning, and synchronously scans a M-th sub-pixel row 210/column and a (M+3)-th sub-pixel row 210/column, which are different each time to implement the DLG driving of the second mode of low resolution and high refresh frequency by dual line gating. The dual line gating technique, which synchronously scans two adjacent sub-pixel rows 210, is difficult to be implemented in the Tri-gate drive architecture. In contrast, according to one or more embodiments of the present disclosure, the DLG driving can be realized by the gate drive circuit 100 in multiple different drive architectures (for example, a 1-gate 1-source drive architecture and a tri-gate drive architecture). Since only one gate drive circuit 100 is used, frame occupation space can also be reduced.

Note that a resolution of the first mode is greater than that of the second mode, and a refresh frequency of the first mode is less than that of the second mode. Specifically, the resolution of the first mode may be twice the resolution of the second mode. The refresh frequency of the first mode may be half of the refresh frequency of the second mode.

Figure 8:
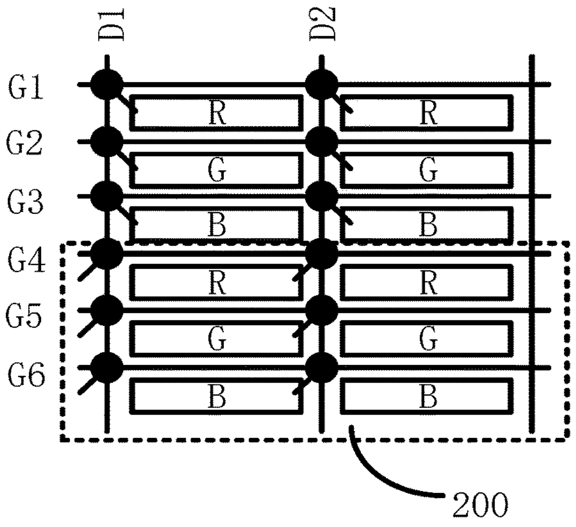
FIG. 8 is a schematic diagram of a second structure of a display panel according to one or more embodiments of the present disclosure.

As shown in FIG. 8, each sub-pixel row in each pixel row 200 includes multiple sub-pixels of a same color, and each sub-pixel row in each pixel row 200 has a different color. Each data line may be connected to one column or two columns of sub-pixels.

Specifically, each pixel row 200 includes a first sub-pixel row including multiple red (R) sub-pixels, a second sub-pixel row including multiple green (G) sub-pixels, and a third sub-pixel row including multiple blue (B) sub-pixels.

A direction in which a length of each sub-pixel is located intersects a column direction, for example, the direction in which the length of each sub-pixel is located may be consistent with or be parallel to the row direction. Each sub-pixel column includes periodically arranged red (R) sub-pixels, green (G) sub-pixels, and blue (B) sub-pixels.

In one or more embodiments, an input terminal of the gate drive circuit 100 is connected to a mode control signal terminal, and the mode control signal terminal outputs a mode control signal GS. In a case where the mode control signal GS is at one of a high potential or a low potential, the gate drive circuit 100 scans a different sub-pixel row 210 in the first mode each time based on the mode control signal GS; Alternatively, in a case where the mode control signal GS is at another of the high potential and the low potential, the gate drive circuit 100 synchronously scans the M-th sub-pixel row 210 and the (M+3)-th sub-pixel row 210 which are different each time in the second mode based on the mode control signal GS.

In one or more embodiments, as shown in FIG. 9, the gate drive circuit 100 further includes a shift register including a first-type shift register 01, a second-type shift register 02, a third-type shift register 03, and a fourth-type shift register 04. The first gate drive group 110 includes a first-type shift register 01 and two second-type shift registers 02 cascaded, the second gate drive group 120 includes a third-type shift register 03 and two second-type shift registers 02 cascaded, and the third gate drive group 130 and the fourth gate drive group 140 each include a fourth-type shift register 04 and two second-type shift registers 02 cascaded. The first-type shift register 01 is connected to a first sub-pixel row 210, and the two second-type shift registers 02 in the first gate drive group 110 are connected to a second sub-pixel row 210 and a third sub-pixel row 210, respectively. The third-type shift register 03 is connected to a fourth sub-pixel row 210, and the two second-type shift registers 02 in the second gate drive group 120 are connected to a fifth sub-pixel row 210 and a sixth sub-pixel row 210, respectively. The fourth-type shift register 04 in the third gate drive group 130 is connected to a seventh sub-pixel row 210, and the two second-type shift registers 02 in the third gate drive group 130 are connected to an eighth sub-pixel row 210 and a ninth sub-pixel row 210, respectively. The fourth-type shift register 04 in the fourth gate drive group 140 is connected to a tenth sub-pixel row 210, and the two second-type shift registers 02 in the fourth gate drive group 140 are connected to an eleventh sub-pixel row 210 and a twelfth sub-pixel row 210, respectively.

Figure 10:
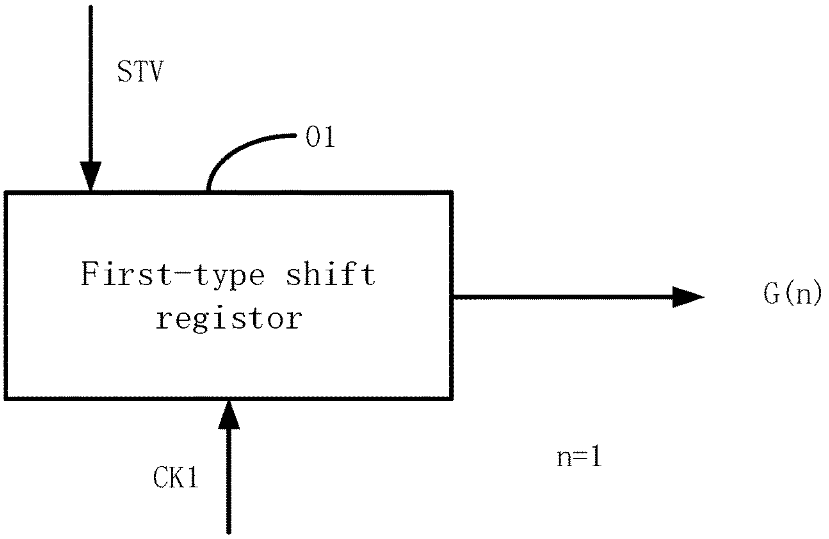
FIG. 10 is a schematic diagram of a structure of a first-type shift register according to one or more embodiments of the present disclosure.

In one or more embodiments, as shown in FIG. 10, the first-type shift register 01 outputs a first-stage gate drive signal based on the start signal STV and the first clock signal CK1. The first-stage gate drive signal may be represented by G (1).

Figure 11:
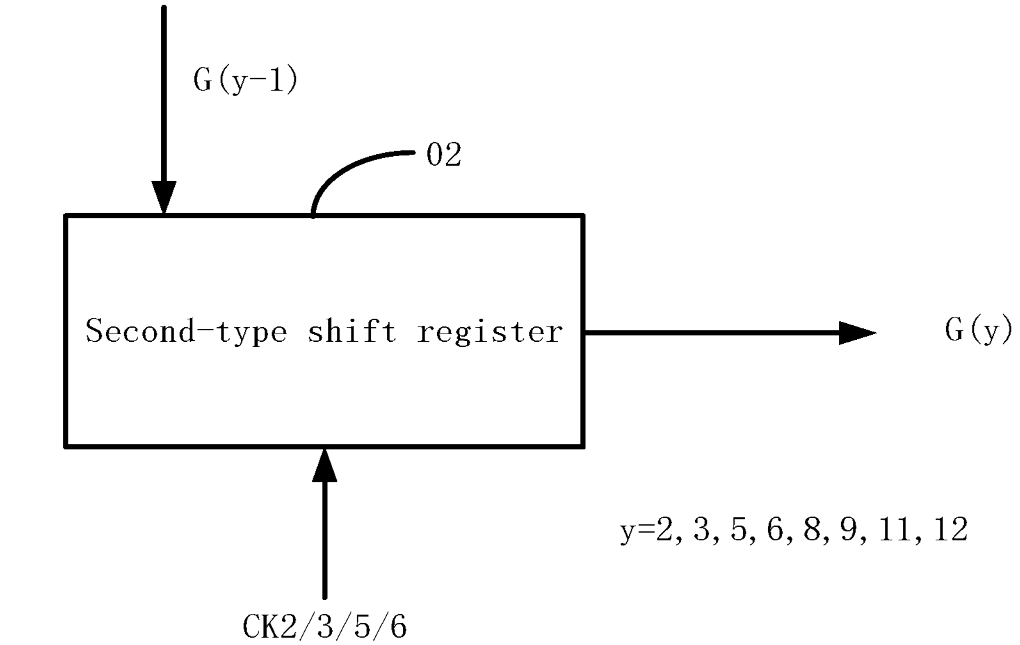
FIG. 11 is a schematic diagram of a structure of a second-type shift register according to one or more embodiments of the present disclosure.

As shown in FIG. 11, the second-type shift register 02 outputs a y-th-stage gate drive signal G (y) based on the (y−1)-th-stage gate drive signal G (y−1) and one of the second clock signal CK2, the third clock signal CK3, the fifth clock signal CK5, and the sixth clock signal CK6, where y is 2, 3, 5, 6, 8, 9, 11, and 12 . . . , and so on.

Figure 12:
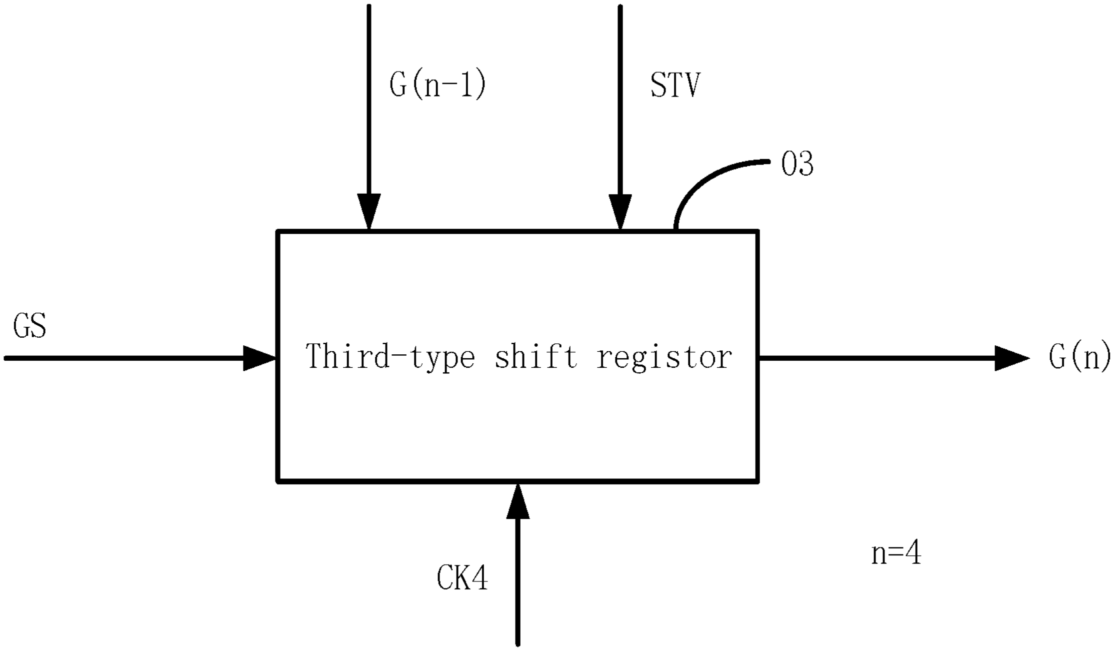
FIG. 12 is a schematic diagram of a structure of a third-type shift register according to one or more embodiments of the present disclosure.

As shown in FIG. 12, the third-type shift register 03 outputs a fourth-stage gate drive signal based on the mode control signal GS, a fourth clock signal CK4, the first-stage gate drive signal, and the start signal STV.

The fourth-stage gate drive signal may be represented by G (4).

Figure 13:
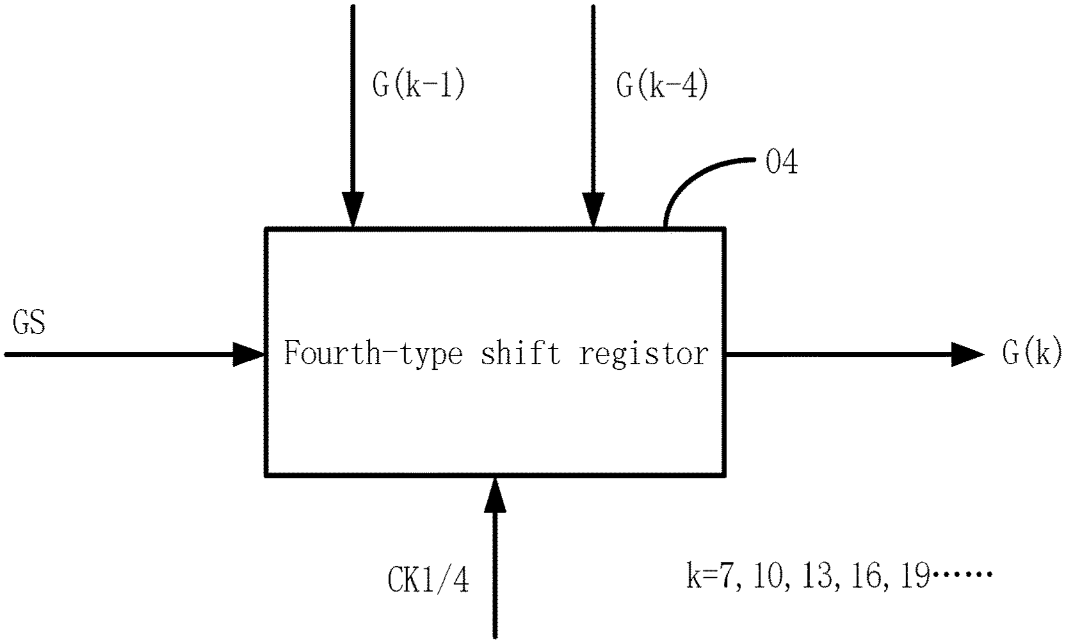
FIG. 13 is a schematic diagram of a structure of a fourth-type shift register according to one or more embodiments of the present disclosure.

As shown in FIG. 13, the fourth-type shift register 04 outputs the k-th-stage gate drive signal G (k) based on the mode control signal GS, the (k−1)-th-stage gate drive signal G (k−1), the (k−4)-th-stage gate drive signal G (k−4), and one of the first clock signal CK1 and the fourth clock signal CK4, where k is 7, 10, 13, 16, and 19 . . . , and so on.

Note that when k is an odd number, the fourth-type shift register 04 is supplied with the first clock signal CK1, and when k is even, the fourth-type shift register 04 is supplied with the fourth clock signal CK4.

In the first mode, the first clock signal CK1 to the sixth clock signal CK6 have a same waveform and phases sequentially delayed. Alternatively, in the second mode, the first clock signal CK1 and the fourth clock signal CK4 have a same waveform and a same phase, the second clock signal CK2 and the fifth clock signal CK5 have a same waveform and a same phase, and the third clock signal CK3 and the sixth clock signal CK6 have a same waveform and a same phase.

Note that in a case of y=3x+2, the second-type shift register 02 outputs the y-th-stage gate drive signal based on the second clock signal CK2 and the (y−1)-th-stage gate drive signal. In a case of y=3x+3, the second-type shift register 02 outputs the y-th-stage gate drive signal based on the third clock signal CK3 and the (y−1)-th-stage gate drive signal. In a case of y=3x+5, the second-type shift register 02 outputs the y-th-stage gate drive signal based on the fifth clock signal CK5 and the (y−1)-th-stage gate drive signal. In a case of y=3x+6, the second-type shift register 02 outputs the y-th-stage gate drive signal based on the sixth clock signal CK6 and the (y−1)-th-stage gate drive signal. X is 0, 2, 4, 6 . . . , and so on.

Figure 14:
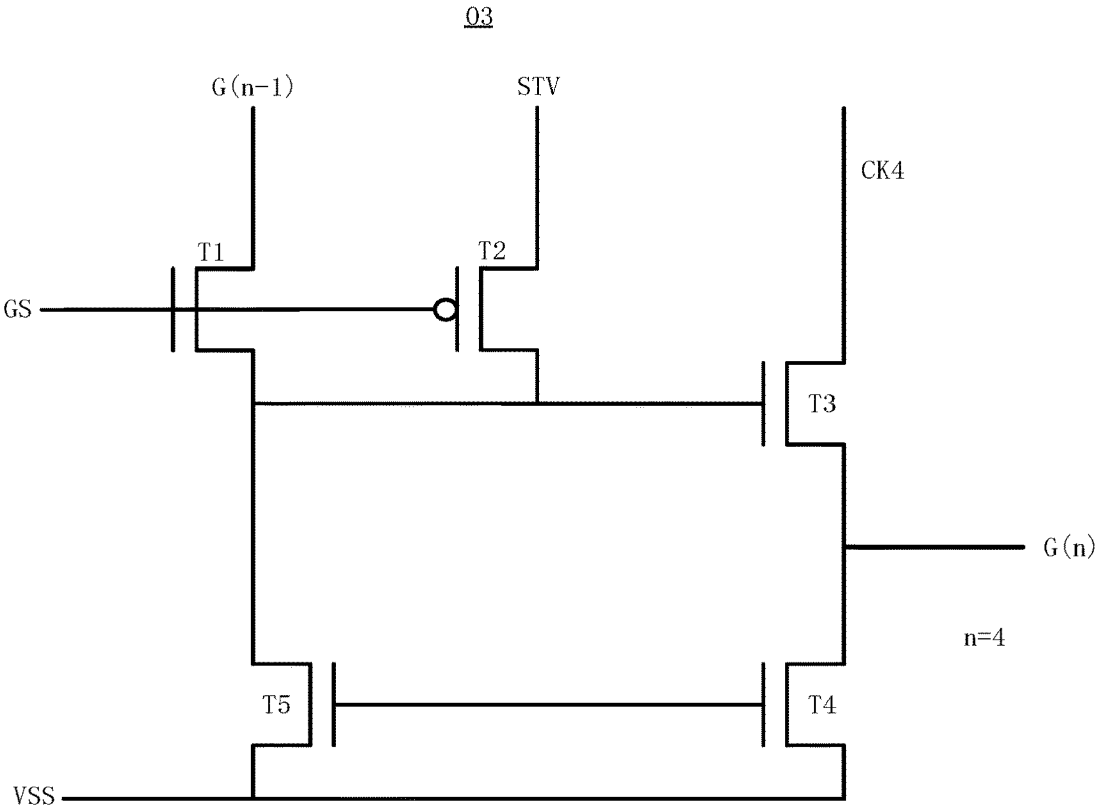
FIG. 14 is a circuit schematic diagram of the third-type shift register shown in FIG. 12.

In one or more embodiments, as shown in FIG. 14, the third-type shift register 03 includes a first transistor T1, a second transistor T2, a third transistor T3, a fourth transistor T4, and a fifth transistor T5. A first electrode of the first transistor T1 is supplied with a first-stage gate drive signal, and a gate of the first transistor T1 is supplied with mode control signal GS. A first electrode of the second transistor T2 is supplied with the start signal STV, a gate of the second transistor T2 is supplied with the mode control signal GS, and a channel type of the second transistor T2 is different from a channel type of the first transistor T1. A first electrode of the third transistor T3 is supplied with the fourth clock signal CK4, and a gate of the third transistor T3 is supplied with the second electrode of the first transistor T1 and the second electrode of the second transistor T2. A first electrode of the fourth transistor T4 is connected to a second electrode of the third transistor T3, and a second electrode of the fourth transistor T4 is supplied with a low-potential signal. A first electrode of the fifth transistor T5 is connected to the gate of the third transistor T3, a second electrode of the fifth transistor T5 is supplied with the low-potential signal, and a gate of the fifth transistor T5 is connected to a gate of the fourth transistor T4.

The first-stage gate drive signal terminal is used to provide the first-stage gate drive signal. The mode control signal terminal is used to provide the mode control signal GS. The start signal terminal is used to provide the start signal STV. The fourth clock signal terminal is used to provide the fourth clock signal CK4. The low-potential signal terminal is used to provide a low-potential signal.

Note that in one or more embodiments, the first transistor T1, the third transistor T3, the fourth transistor T4, and the fifth transistor T5 may all be N-channel thin film transistors, and the second transistor T2 may be a P-channel thin film transistor. In one or more other embodiments, the first transistor T1, the third transistor T3, the fourth transistor T4, and the fifth transistor T5 may all be P-channel type thin film transistors, and the second transistor T2 may be an N-channel type thin film transistor.

In one or more other embodiments, the gate of the fourth transistor T4 may also be connected to a (3+w)-th-stage gate drive signal, where w is an integer greater than or equal to 1.

Figure 15:
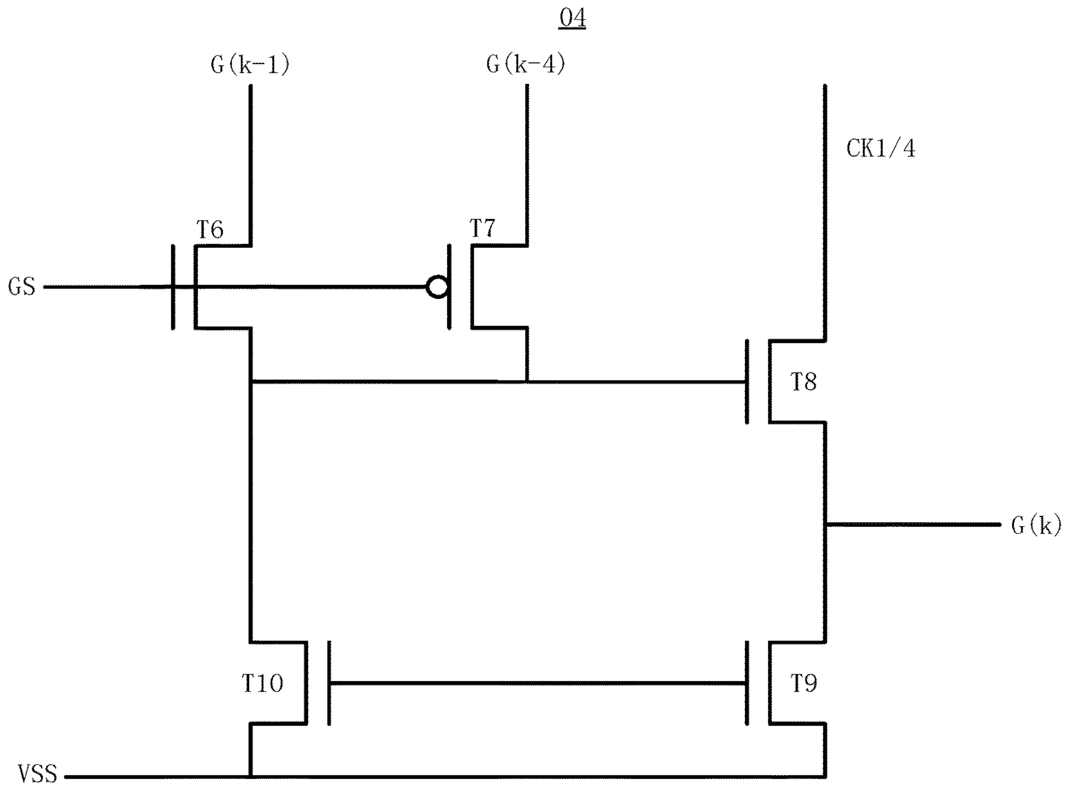
FIG. 15 is a circuit schematic diagram of a fourth-type shift register shown in FIG. 13.

In one or more embodiments, as shown in FIG. 15, the fourth-type shift register 04 includes a sixth transistor T6, a seventh transistor T7, an eighth transistor T8, a ninth transistor T9, and a tenth transistor T10. A first electrode of the sixth transistor T6 is connected to the (k−1)-th-stage gate drive signal, and a gate of the sixth transistor T6 is supplied with the gate access mode control signal GS. A first electrode of the seventh transistor T7 is supplied with the (k−4)-th-stage gate drive signal, a gate of the seventh transistor T7 is supplied with the gate access mode control signal GS, and a channel type of the seventh transistor T7 is different from a channel type of the sixth transistor T6. A first electrode of the eighth transistor T8 is supplied with one of the first clock signal CK1 and the fourth clock signal CK4, and a gate of the eighth transistor T8 is connected to a second electrode of the sixth transistor T6 and a second electrode of the seventh transistor T7. A first electrode of the ninth transistor T9 is connected to a second electrode of the eighth transistor T8, and a second electrode of the ninth transistor T9 is connected to supplied with a low-potential signal. A first electrode of the tenth transistor T10 is connected to a gate of the eighth transistor T8, a second electrode of the tenth transistor T10 is supplied with a low-potential signal, and a gate of the tenth transistor T10 is connected to a gate of the ninth transistor T9.

Note that the fourth-type shift register 04 is similar to the third-type shift register 03 in structure.

The (k−1)-th-stage gate drive signal terminal is used to supply the (k−1)-th-stage gate drive signal. The (k−4)-th-stage gate drive signal terminal is used to provide the (k−4)-th-stage gate drive signal. The first clock signal terminal is used to provide the first clock signal CK1.

Figure 16:
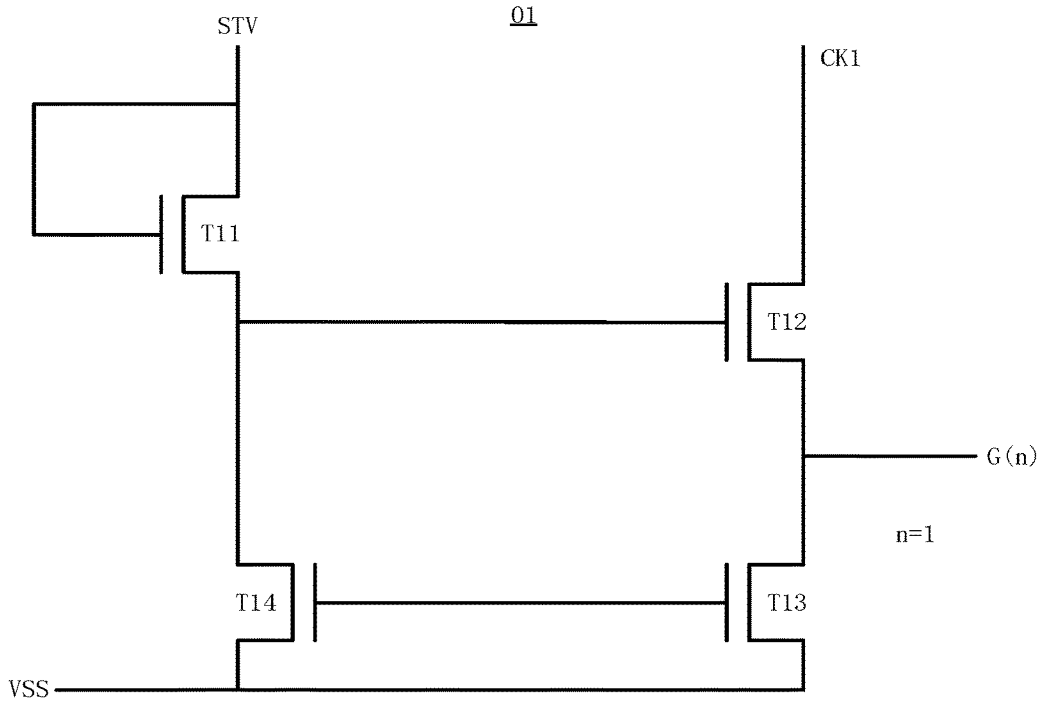
FIG. 16 is a circuit schematic diagram of the first-type shift register shown in FIG. 10.

In one or more embodiments, as shown in FIG. 16, the first-type shift register 01 includes an eleventh transistor T11, a twelfth transistor T12, a thirteenth transistor T13, and a fourteenth transistor T14. A first electrode of the eleventh transistor T11 is connected to a gate of the eleventh transistor T11 and supplied with a (k−1)-th-stage gate drive signal. A first electrode of the twelfth transistor T12 is supplied with the first clock signal CK1, and a gate of the twelfth transistor T12 is connected to a second electrode of the eleventh transistor T11. A first electrode of the thirteenth transistor T13 is connected to a second electrode of the twelfth transistor T12, and a second electrode of the thirteenth transistor T13 is supplied with a low-potential signal. A first electrode of the fourteenth transistor T14 is connected to a gate of the twelfth transistor T12, a second electrode of the fourteenth transistor T14 is supplied with a low-potential signal, and a gate of the fourteenth transistor T14 is connected to a gate of the thirteenth transistor T13.

Figure 17:
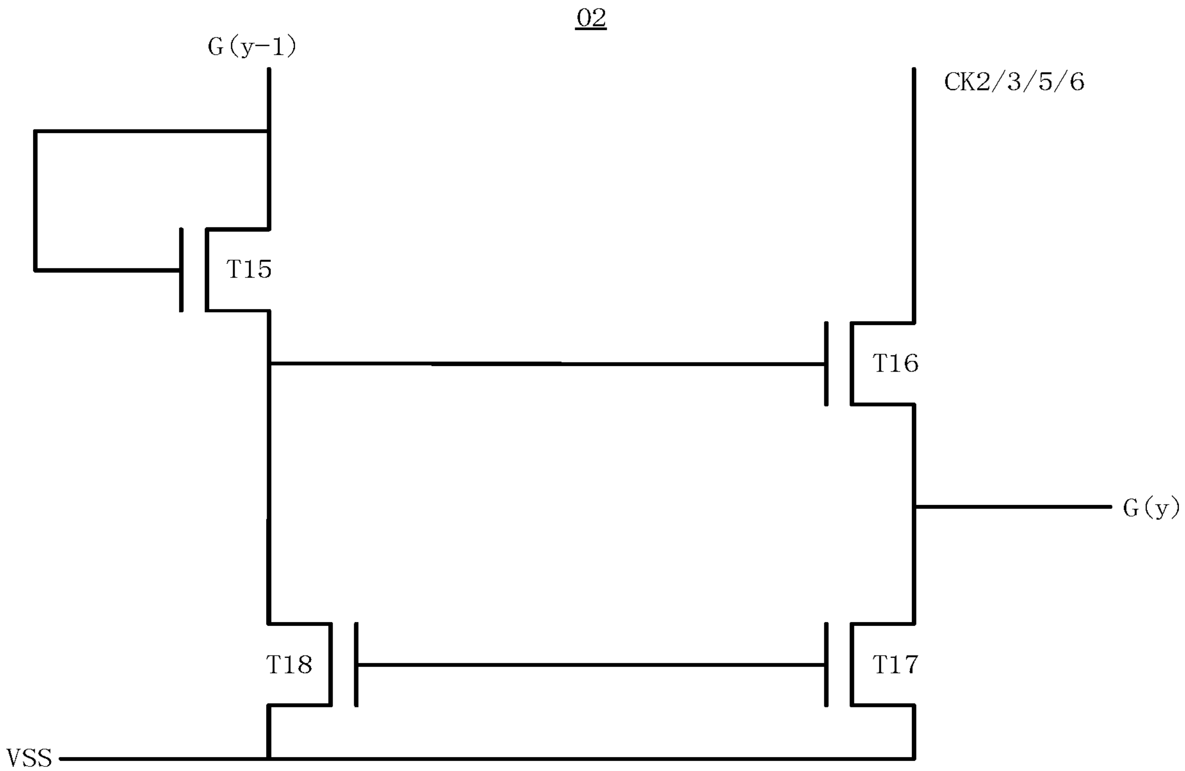
FIG. 17 is a schematic circuit diagram of the second-type shift register shown in FIG. 11.

In one or more embodiments, as shown in FIG. 17, the shift register 02 of the second type includes a fifteenth transistor T15, a sixteenth transistor T16, a seventeenth transistor T17, and an eighteenth transistor T18. A first electrode of the fifteenth transistor T15 is connected to a gate of the fifteenth transistor T15 and connected to the (y−1)-th-stage gate drive signal. A first electrode of the sixteenth transistor T16 is connected to the second clock signal CK2/the third clock signal CK3/the fifth clock signal CK5/the sixth clock signal CK6, and a gate of the sixteenth transistor T16 is connected to the second electrode of the fifteenth transistor T15. A first electrode of the seventeenth transistor T17 is connected to a second electrode of the sixteenth transistor T16, and the second electrode of the seventeenth transistor T17 is connected to a low-potential signal. A first electrode of the eighteenth transistor T18 is connected to a gate of the sixteenth transistor T16, a second electrode of the eighteenth transistor T18 is connected to a low-potential signal, and a gate of the eighteenth transistor T18 is connected to a gate of the seventeenth transistor T17.

The (y−1)-th-stage gate drive signal terminal is used to supply the (y−1)-th-stage gate drive signal. The second clock signal terminal is used to provide the second clock signal CK2. The third clock signal terminal is used to provide the third clock signal CK3. The fifth clock signal terminal is used to provide the fifth clock signal CK5. The sixth clock signal terminal is used to provide the sixth clock signal CK6.

Figure 18:
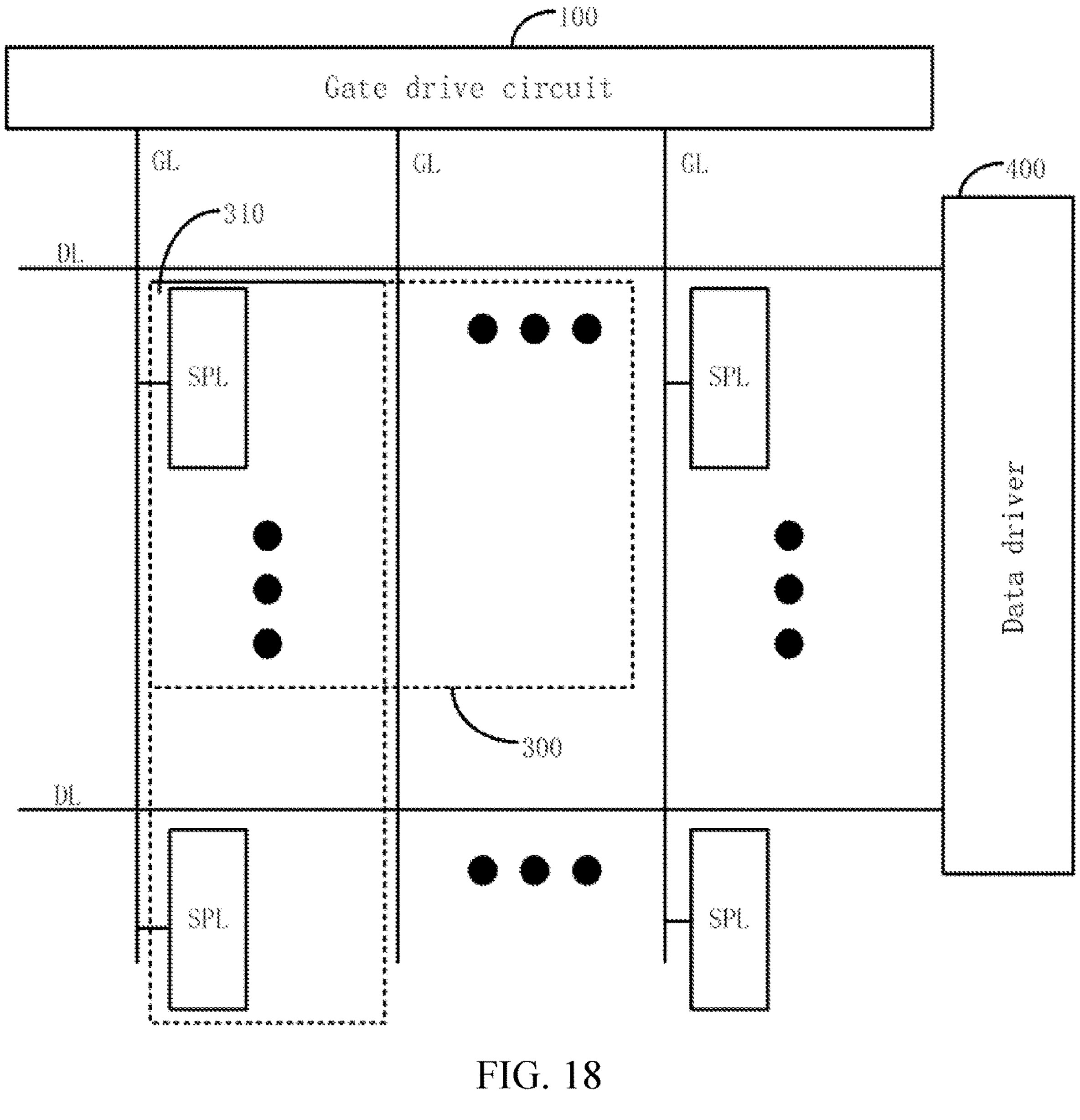
FIG. 18 is a schematic diagram of a fourth structure of a display panel according to one or more embodiments of the present disclosure.

In one or more embodiments, as shown in FIG. 18, one or more embodiments further provides a display panel including multiple pixel columns 300, multiple data lines (DL), a data driver 400, multiple scan lines (GL), and a gate drive circuit 100. The multiple pixel columns 300 include multiple odd-numbered pixel columns 300 and multiple even-numbered pixel columns 300 that are sequentially arranged alternately in a row direction, and each pixel column 300 includes three adjacent sub-pixel columns 310. Each data line is connected to a corresponding sub-pixel row 210. The data driver 400 is connected to multiple data lines and is located in the arrangement direction of the multiple pixel columns 300. Each scan line is connected to a sub-pixel column 310. The gate driver circuit 100 is located in an extension direction of the multiple pixel columns 300, and is connected to the multiple scan lines.

In one or more embodiments, the gate drive circuit 100 includes a first gate drive group 110, a second gate drive group 120, at least one third gate drive group 130, and at least one fourth gate drive group 140. The first gate drive group 110 is connected to a first odd-numbered pixel column 300 through corresponding scan lines. The second gate drive group 120 is connected to a first even-numbered pixel column 300 through corresponding scanning lines; Each third gate drive group 130 is connected to another odd-numbered pixel column 300 through corresponding scanning lines. Each fourth gate drive group 140 is connected to another even-numbered pixel column 300 through corresponding scanning lines. In the first mode, the first gate drive group 110, the second gate drive group 120, the third gate drive group 130, and the fourth gate drive group 140 are cascaded to scan a different sub-pixel column 310 each time. Alternatively, in the second mode, the first gate drive group 110 and the third gate drive group 130 are cascaded, the second gate drive group 120 and the fourth gate drive group 140 are cascaded. The first gate drive group 110 and the second gate drive group 120 respectively scan the first odd-numbered pixel column 300 and the first even-numbered pixel column 300 synchronously, and the third gate drive group 130 and the fourth gate drive group 140 respectively scan the second odd-numbered pixel column 300 and the second even-numbered pixel column 300 synchronously.

Figure 23:
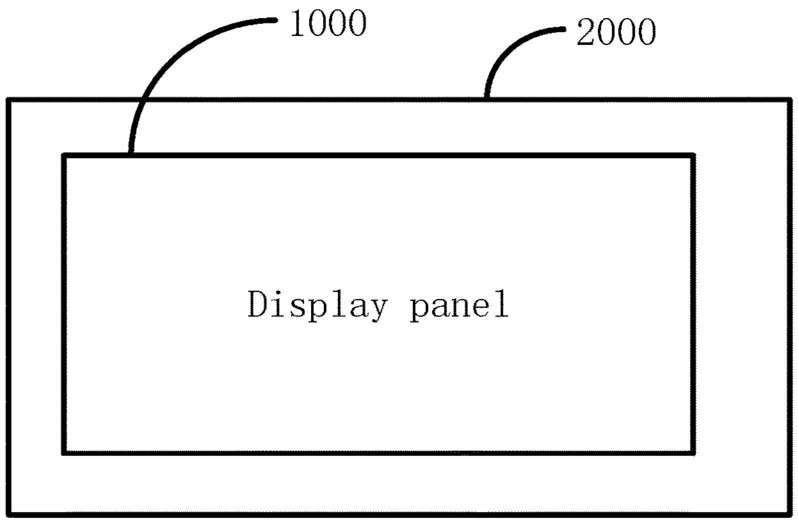
FIG. 23 is a schematic diagram of a structure of a display device according to one or more embodiments of the present disclosure.

It will be appreciated that in the display panel 1000 according to one or more embodiments, referring back to FIGS. 7 and 23, the gate drive circuit 100 scans a different sub-pixel row 210/column each time to implement the normal driving of the first mode having high resolution and low refresh frequency by row-by-row/column scanning, and synchronously scans a M-th sub-pixel row 210/column and a (M+3)-th sub-pixel row 210/column which are different each time to implement the DLG driving of the second mode of low resolution and high refresh frequency by dual line gating. The dual line gating technique which synchronously scanning two adjacent sub-pixel rows 210 is difficult to be implemented in the Tri-gate drive architecture. In contrast, according to one or more embodiments of the present disclosure, the DLG driving can be realized by the gate drive circuit 100 in multiple different drive architectures (for example, a 1-gate 1-source drive architecture and a tri-gate drive architecture). Since only one gate drive circuit 100 is used, frame occupation space can also be reduced.

In addition, and referring back to FIGS. 7 and 18, by connecting each data line to a corresponding sub-pixel row 210, connecting each scan line to a sub-pixel column 310, and arranging the data driver 400 in the arrangement direction of the multiple pixel columns 300, the number of data lines used can be reduced, thereby reducing the number of data driver chips used in the data driver 400. As a result, the fan-out area required for the data lines connected to each data driver chip is reduced, thereby reducing the resistance difference between different data lines, and preventing the dark band phenomenon from occurring in display.

Note that the resolution of the first mode is greater than that of the second mode, and the refresh frequency of the first mode is less than that of the second mode.

Figure 19:
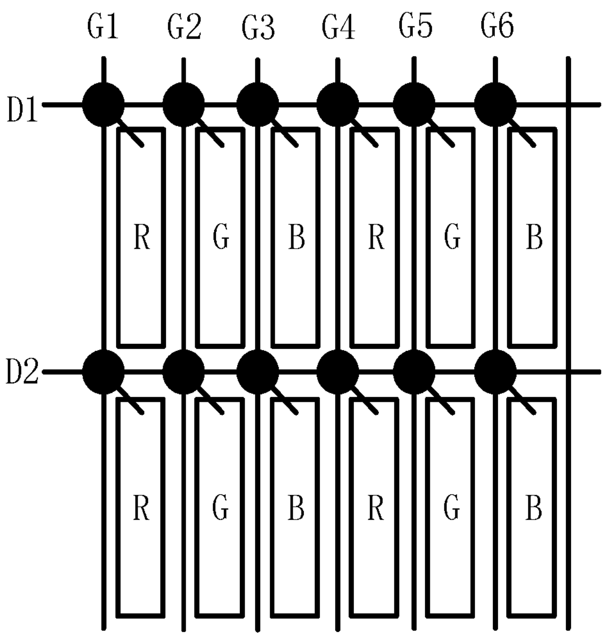
FIG. 19 is a schematic diagram of a fifth structure of a display panel according to one or more embodiments of the present disclosure.
Figure 20:
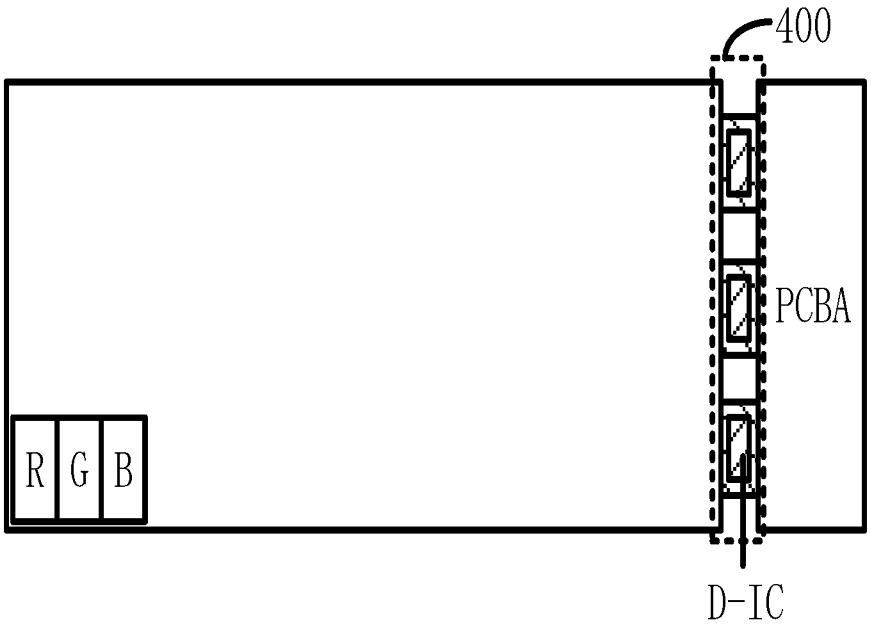
FIG. 20 is a schematic diagram of a sixth structure of a display panel according to one or more embodiments of the present disclosure.

It should be noted that the arrangement direction of the RGB in one or more embodiments corresponds to the arrangement direction of the RGB in the 1G1D drive architecture. As shown in FIGS. 19 and 20, the positions of the scan lines G1-G6 and the data lines D1-D2 are swapped.

Specifically, as shown in FIGS. 18 and 19, each pixel column 310 includes a first sub-pixel column including multiple red (R) sub-pixels SPL, a second sub-pixel column including multiple green (G) sub-pixels SPL, and a third sub-pixel column including multiple blue (B) sub-pixels SPL.

The direction in which the length of each sub-pixel SPL is located intersects the row direction, for example, the direction in which the length of each sub-pixel SPL is located may be consistent with or be parallel to the column direction. Each sub-pixel row includes a periodically arranged red (R) sub-pixel SPL, a green (G) sub-pixel SPL, and a blue (B) sub-pixel SPL.

After the position of a driving device such as a data drive chip (D-IC), and a circuit board PCAB, and so on is changed to the short-side binding (bonding) of the display panel, in addition to that the number of data drive chips (Source COF IC) is reduced to 3 (720 output pins of each data drive chip can provide 720 data signals, and corresponding data signals can be provided for 2160 data lines in total), the fan-out area corresponding to each data drive chip is also shortened. Based on a usual 16:9 aspect ratio of a TV, a width (W) of the fan-out area after the improvement (as provided by the present disclosure) is only ¾ of that before the improvement (as provided by the related devices), so that the degree of fanout mura is also lighter.

Specifically, the long side/short side=16/9. $W_{after\ improvement}/W_{before\ improvement}=(9/3)/(16/4)=3/4$.

In one or more embodiments, and referring back to FIG. 18, an input terminal of the gate drive circuit 100 is connected to the mode control signal terminal, and the mode control signal terminal outputs the mode control signal GS. In a case where the mode control signal GS is at one of a high potential or a low potential, the gate drive circuit 100 scans a different sub-pixel column 310 in the first mode each time based on the mode control signal GS. Alternatively, in a case where the mode control signal GS is at another of the high potential and the low potential, the gate drive circuit 100 synchronously scans the M-th sub-pixel column 310 and the M+3-th sub-pixel column 310 which are different each time in the second mode based on the mode control signal GS.

In one or more embodiments, the first gate drive group 110 includes a first-type shift register 01 and two second-type shift registers 02 which are cascaded, the second gate drive group 120 includes a third-type shift register 03 and two second-type shift registers 02 which are cascaded, and the third gate drive group 130 and the fourth gate drive group 140 each include a fourth-type shift register 04 and two second-type shift registers 02 which are cascaded. The first-type shift register 01 is connected to the first sub-pixel column 310, and the two second-type shift registers 02 in the first gate drive group 110 are connected to the second sub-pixel column 310 and the third sub-pixel column 310, respectively. The third-type shift register 03 is connected to the fourth sub-pixel column 310, and the two second-type shift registers 02 in the second gate drive group 120 are connected to the fifth sub-pixel column 310 and the sixth sub-pixel column 310, respectively. The fourth-type shift register 04 in the third gate drive group 130 is connected to the seventh sub-pixel column 310, and the two second-type shift registers 02 in the third gate drive group 130 are connected to the eighth sub-pixel column 310 and the ninth sub-pixel column 310, respectively.

The fourth-type shift register 04 in the fourth gate drive group 140 is connected to the tenth sub-pixel column 310, and the two second-type shift registers 02 in the fourth gate drive group 140 are connected to the eleventh sub-pixel column 310 and the twelfth sub-pixel column 310, respectively.

Figure 21:
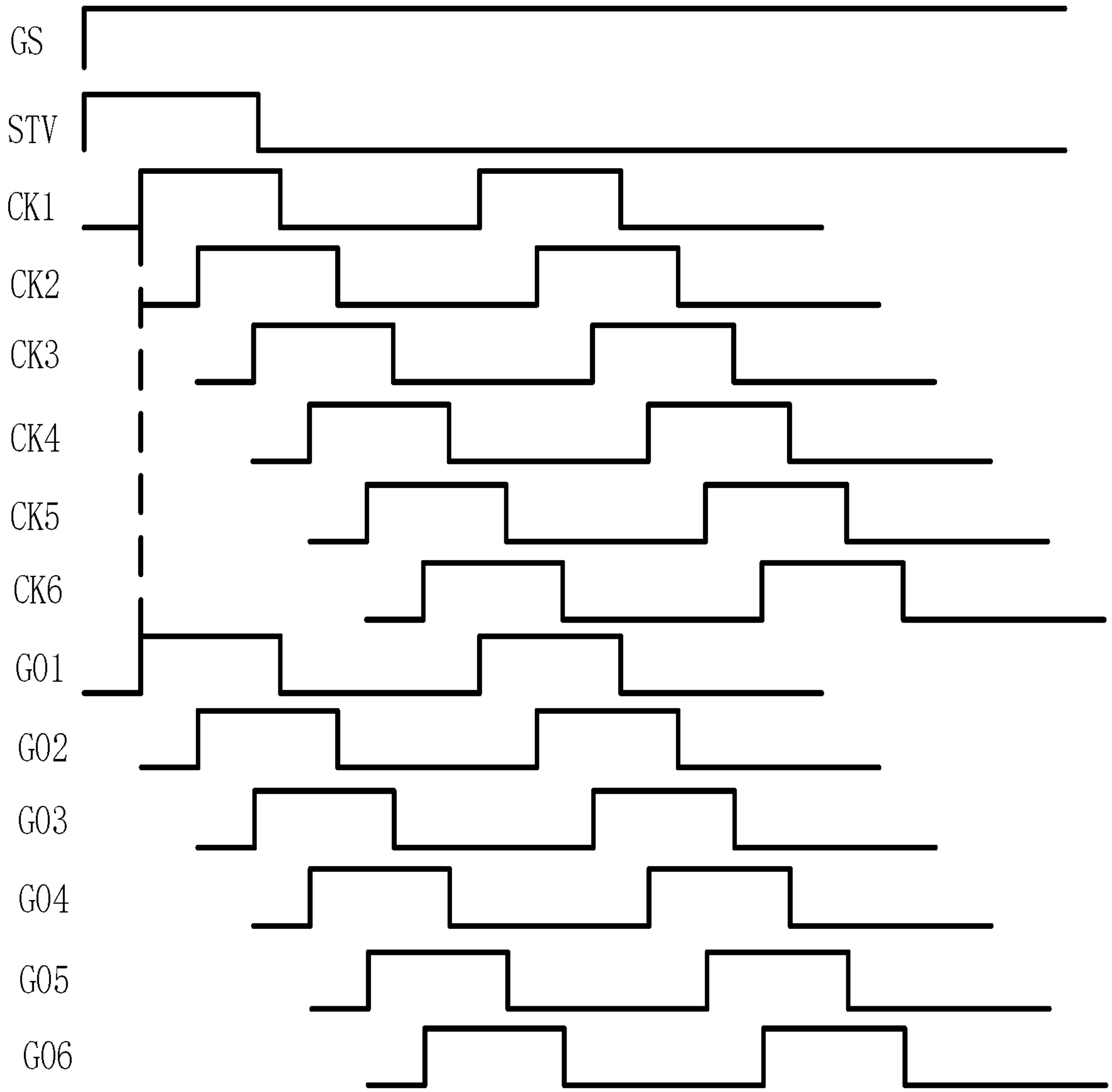
FIG. 21 is a timing diagram of operation in a first mode according to one or more embodiments of the present disclosure.

In conclusion, when the mode control signal GS maintains the high-level output, the Tri-gate drive architecture operates in the first mode (normal row-by-row scanning). In this case, the timing of the start signal STV, each clock signal CK1-CK 6, and each scan signal G01-G06 is shown in FIG. 21, and the scan signal G (n) (n=1, 2, 3, 4, 5 . . . ) outputs in sequence to enable display at a resolution of 4K*2K and a refresh frequency of 60 Hz.

Figure 22:
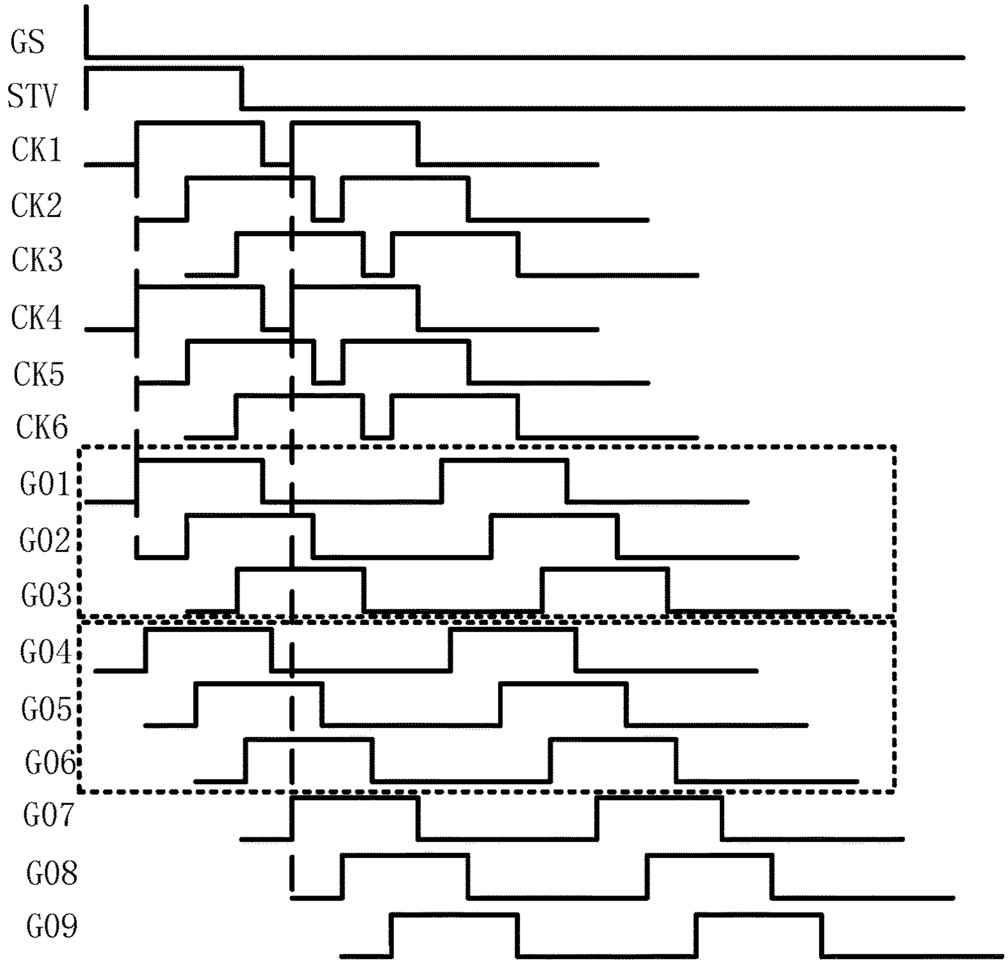
FIG. 22 is a timing diagram of operation in a second mode according to one or more embodiments of the present disclosure.

When the mode control signal GS maintains the low level output, the Tri-gate drive architecture operates in the second mode (DLG drive), the timing of the start signal STV, each clock signal CK1-6, and each scan signal G01-09 is modified as shown in FIG. 22, and then the scan signal G (n) (n=1, 2, 3, 4, 5 . . . ) scans an odd-numbered pixel row 200 (three sub-pixel rows 210 respectively driven by the G01-G03) and an even-numbered pixel row 200 (three sub-pixel rows 210 respectively driven by the G04-G06) synchronously instead of outputting in sequence, so that display at a resolution of 4K*1K and a refresh frequency of 120 Hz can be realized.

In one or more embodiments, one or more embodiments provides a display device 2000 including the display panel 1000 in at least one or more embodiments described above, as shown in FIG. 23.

It will be appreciated that since the display device 2000 according to one or more embodiments includes the display panel 1000 in the at least one or more embodiments described above, likewise, the gate drive circuit 100 scans a different sub-pixel row 210/column each time to implement the normal driving of the first mode having high resolution and low refresh frequency by row-by-row/column scanning, and synchronously scans a M-th sub-pixel row 210/column and a (M+3)-th sub-pixel row 210/column which are different each time to implement the DLG driving of the second mode of low resolution and high refresh frequency by dual line gating. The dual line gating technique which synchronously scanning two adjacent sub-pixel rows 210 is difficult to be implemented in the Tri-gate drive architecture. In contrast, according to one or more embodiments of the present disclosure, the DLG driving can be realized by the gate drive circuit 100 in multiple different drive architectures (for example, a 1-gate 1-source drive architecture and a tri-gate drive architecture). Since only one gate drive circuit 100 is used, frame occupation space can also be reduced.

In addition, by connecting each data line to a corresponding sub-pixel row 210, connecting each scan line to a sub-pixel column 310, and arranging the data driver 400 in the arrangement direction of the multiple pixel columns 300, the number of data lines used can be reduced, thereby reducing the number of data driver chips used in the data driver 400. Thus the fan-out area required for the data lines connected to each data driver chip is reduced, thereby reducing the resistance difference between different data lines, further preventing or reducing the dark band phenomenon occurring in display.

It should be noted that the display panel 1000 may be, but is not limited to, a display panel of a tri-gate driving architecture, or may be a display panel of other applicable drive architecture, for example, a display panel of a 1G1D driving architecture.

In the above-mentioned embodiments, the description of each embodiment has its own emphasis, and parts not described in detail in a certain embodiment may be referred to the related description of other embodiments.

The above detailed description of the display panel provided by the embodiments of the present disclosure, and the detailed description of the principles and embodiments of the present disclosure using specific examples is provided herein. The description of the above embodiments is merely intended to help understand the technical solution and the core idea of the present disclosure. It will be appreciated by those of ordinary skill in the art that modifications may still be made to the technical solutions described in the foregoing embodiments, or equivalents may be made to some of the technical features therein; These modifications or substitutions do not depart the essence of the corresponding technical solutions from the scope of the technical solutions of the embodiments of the present disclosure.

What is claimed is:

1. A display panel, comprising: a plurality of pixel rows including a plurality of odd-numbered pixel rows and a plurality of even-numbered pixel rows arranged alternately in sequence in a column direction, wherein each of the pixel rows comprises three adjacent sub-pixel rows;

a plurality of data lines, each of the data lines being connected to a sub-pixel column of the display panel; a plurality of scan lines, each of the scan lines being connected to one of the sub-pixel rows; and a gate drive circuit connected to the plurality of scan lines, the gate drive circuit comprising:

a first gate drive group connected to a first odd-numbered pixel row of the plurality of odd-numbered pixel rows through 3 scan lines of the scan lines;

a second gate drive group connected to a first even-numbered pixel row of the plurality of even-numbered pixel rows through 3 scan lines of the scan lines;

at least one third gate drive group, each of the third gate drive groups being connected to an other odd-numbered pixel row of the plurality of odd-numbered pixel rows through 3 scan lines of the scan lines;

and at least one fourth gate drive group, each of the fourth gate drive groups being connected to an other even-numbered pixel row of the plurality of even-numbered pixel rows through 3 scan lines of the scan lines, wherein the first gate drive group, the second gate drive group, the third gate drive group, and the fourth gate drive group are cascaded to scan a different sub-pixel row each time in a first mode, and the first gate drive group and the third gate drive group are cascaded, the second gate drive group and the fourth gate drive group are cascaded, the first gate drive group and the second gate drive group are configured to respectively synchronously scan the first odd-numbered pixel row and the first even-numbered pixel row, and the third gate drive group and the fourth gate drive group are configured to respectively synchronously scan a second odd-numbered pixel row and a second even-numbered pixel row in a second mode;

wherein an input terminal of the gate drive circuit is connected to a mode control signal terminal, the mode control signal terminal is configured to output a mode control signal, wherein the gate drive circuit further comprises a shift register, the shift register comprising a first-type shift register, a second-type shift register, a third-type shift register, and a fourth-type shift register;

wherein the first-type shift register is configured to output a first-stage gate drive signal based on a start signal and a first clock signal;

the second-type shift register is configured to output a y-th-stage gate drive signal based on a (v−1)-th-stage gate drive signal and one of a second clock signal, a third clock signal, a fifth clock signal, and a sixth clock signal, wherein y is one of 2, 3, 5, 6, 8, 9, 11, and 12;

the third-type shift register is configured to output a fourth-stage gate drive signal based on the mode control signal, a fourth clock signal, the first-stage gate drive signal, and the start signal;

the fourth-type shift register is configured to output a k-th-stage gate drive signal based on the mode control signal, a (k−1)-th-stage gate drive signal, and a (k−4)-th-stage gate drive signal, and one of a first clock signal or a fourth clock signal, where k is one of 7, 10, 13, 16, and 19;

in the first mode, the first clock signal and the sixth clock signal have a same waveform and phases sequentially delayed; and in the second mode, the first clock signal and the fourth clock signal have a same waveform and a same phase, the second clock signal and the fifth clock signal have a same waveform and a same phase, and the third clock signal and the sixth clock signal have a same waveform and a same phase.

2. The display panel according to claim 1, wherein the gate drive circuit is configured to scan a different sub-pixel row each time in the first mode based on the mode control signal, in a case where the mode control signal is at one of a high potential and a low potential, and the gate drive circuit is configured to synchronously scan a M-th sub-pixel row and a (M+3)-th sub-pixel row in the second mode each time based on the mode control signal, in a case where the mode control signal is at an other of the high potential and the low potential, wherein M is an integer greater than or equal to 1.

3. The display panel according to claim 2, wherein a resolution of the first mode is greater than a resolution of the second mode, and a refresh frequency of the first mode is less than a refresh frequency of the second mode.

4. The display panel according to claim 3, wherein: the first gate drive group comprises the first-type shift register and two of the second-type shift registers cascaded; the second gate drive group comprises the third-type shift register and two of the second-type shift registers cascaded; the third gate drive group and the fourth gate drive group each comprise the fourth-type shift register and two of the second-type shift registers cascaded; the first-type shift register and the two of the second-type shift registers in the first gate drive group are connected to three sub-pixel rows of the first odd-numbered pixel row, respectively; the third-type shift register and two of the second-type shift registers in the second gate drive group are connected to three sub-pixel rows of the first even-numbered pixel row, respectively; the fourth-type shift register and two of the second-type shift registers in the third gate drive group are connected to three sub-pixel rows of the other odd-numbered pixel row, respectively; and the fourth-type shift register and two of the second-type shift registers in the fourth gate drive group are connected to three sub-pixel rows of the other even-numbered pixel row, respectively.

5. The display panel according to claim 1, wherein the second-type shift register is configured to output a y-th-stage gate drive signal based on the second clock signal and the (y−1)-th-stage gate drive signal, in a case of y=3x+2;

the second-type shift register is configured to output a y-th-stage gate drive signal based on the third clock signal and the (y−1)-th-stage gate drive signal, in a case of y=3x+3;

the second-type shift register is configured to output a y-th-stage gate drive signal based on the fifth clock signal and the (y−1)-th-stage gate drive signal, in a case of y=3x+5;

the second-type shift register is configured to output the y-th-stage gate drive signal based on the sixth clock signal and the (y−1)-th-stage gate drive signal, in a case of y=3x+6; and x is one of 0, 2, 4, and 6.

6. The display panel according to claim 1, wherein the third-type shift register comprises:

a first transistor having a first electrode connected to the first-stage gate drive signal terminal and a gate connected to the mode control signal terminal;

a second transistor, a first electrode of the second transistor being connected to the start signal, a gate of the second transistor being connected to the mode control signal terminal, and a channel type of the second transistor being different from a channel type of the first transistor;

a third transistor having a first electrode connected to the fourth clock signal terminal and a gate connected to a second electrode of the first transistor and a second electrode of the second transistor;

a fourth transistor, a first electrode of the fourth transistor being connected to a second electrode of the third transistor, and a second electrode of the fourth transistor being connected to a low-potential signal terminal; and a fifth transistor having a first electrode connected to a gate of the third transistor, a second electrode connected to the low-potential signal terminal, and a gate connected to a gate of the fourth transistor.

7. The display panel according to claim 1, wherein the fourth-type shift register comprises:

a sixth transistor having a first electrode connected to the (k−1)-th-stage gate drive signal input and a gate connected to the mode control signal terminal;

a seventh transistor having a first electrode connected to the (k−4)-th-stage gate drive signal terminal, a gate of the seventh transistor connected to the mode control signal terminal, a channel type of the seventh transistor being different from a channel type of the sixth transistor;

an eighth transistor having a first electrode connected to one of the first clock signal terminal and the fourth clock signal terminal, and a gate connected to a second electrode of the sixth transistor and a second electrode of the seventh transistor;

a ninth transistor having a first electrode connected to a second electrode of the eighth transistor and a second electrode connected to a low-potential signal terminal; and a tenth transistor having a first electrode connected to a gate of the eighth transistor, a second electrode connected to the low-potential input terminal, and a gate connected to a gate of the ninth transistor.

8. The display panel according to claim 1, wherein each of the pixel rows includes a first sub-pixel row, a second sub-pixel row, and a third sub-pixel row, the first sub-pixel row comprising a plurality of red sub-pixels, the second sub-pixel row comprising a plurality of green sub-pixels, and the third sub-pixel row comprising a plurality of blue sub-pixels; and a direction in which a length of each of the sub-pixels is located intersects a column direction.

9. A display panel, comprising:

a plurality of pixel columns including a plurality of odd-numbered pixel columns and a plurality of even-numbered pixel columns arranged alternately in sequence in a row direction, wherein each of the pixel columns comprises three adjacent sub-pixel columns;

a plurality of data lines, each of the data lines being connected to a sub-pixel row of the display panel;

a data driver connected to the data lines and disposed in an arrangement direction of the pixel columns;

a plurality of scan lines, each of the scan lines being connected to one of the sub-pixel columns; and a gate drive circuit disposed in an extension direction of the pixel columns and connected to the plurality of scan lines, the gate drive circuit comprising:

a first gate drive group connected to a first odd-numbered pixel column of the plurality of odd-numbered pixel columns through 3 scan lines of the scan lines;

a second gate drive group connected to a first even-numbered pixel column in the row direction of the plurality of even-numbered pixel columns through 3 scan lines of the scan lines;

at least one third gate drive group, each of the third gate drive groups being connected to an other odd-numbered pixel column in the row direction of the plurality of odd-numbered pixel columns through 3 scan lines of the scan lines; and at least one fourth gate drive group, each of the fourth gate drive groups being connected to an other even-numbered pixel column of the plurality of even-numbered pixel column s through 3 scan lines of the scan lines, wherein the first gate drive group, the second gate drive group, the third gate drive group, and the fourth gate drive group are cascaded to scan a different sub-pixel column each time in a first mode, and the first gate drive group and the third gate drive group are cascaded, the second gate drive group and the fourth gate drive group are cascaded, the first gate drive group and the second gate drive group are configured to respectively synchronously scan the first odd-numbered pixel column and the first even-numbered pixel column, and the third gate drive group and the fourth gate drive group are configured to respectively synchronously scan a second odd-numbered pixel column and a second even-numbered pixel column in a second mode;

wherein an input terminal of the gate drive circuit is connected to a mode control signal terminal, the mode control signal terminal is configured to output a mode control signal, wherein the gate drive circuit further comprises a shift register, the shift register comprises a first-type shift register, a second-type shift register, a third-type shift register, and a fourth-type shift register;

wherein the first-type shift register is configured to output a first-stage gate drive signal based on a start signal and a first clock signal;

the second-type shift register is configured to output a y-th-stage gate drive signal based on a (y−1)-th-stage gate drive signal and one of a second clock signal, a third clock signal, a fifth clock signal, and a sixth clock signal, wherein y is one of 2, 3, 5, 6, 8, 9, 11, and 12;

the third-type shift register is configured to output a fourth-stage gate drive signal based on the mode control signal, a fourth clock signal, the first-stage gate drive signal, and the start signal;

the fourth-type shift register is configured to output a k-th-stage gate drive signal based on the mode control signal, a (k−1)-th-stage gate drive signal, and a (k−4)-th-stage gate drive signal, and one of a first clock signal or a fourth clock signal, where k is one of 7, 10, 13, 16, and 19;

in the first mode, the first clock signal and the sixth clock signal have a same waveform and phases sequentially delayed; and in the second mode, the first clock signal and the fourth clock signal have a same waveform and a same phase, the second clock signal and the fifth clock signal have a same waveform and a same phase, and the third clock signal and the sixth clock signal have a same waveform and a same phase.

10. The display panel according to claim 9, wherein the gate drive circuit is configured to scan a different sub-pixel row each time in the first mode based on the mode control signal in a case where the mode control signal is at one of a high potential and a low potential, and the gate drive circuit is configured to synchronously scan a M-th sub-pixel column and a (M+3)-th sub-pixel column in the second mode each time based on the mode control signal, in a case where the mode control signal is at an other of the high potential and the low potential, wherein M is an integer greater than or equal to 1.

11. The display panel according to claim 10, wherein a resolution of the first mode is greater than a resolution of the second mode, and a refresh frequency of the first mode is less than a refresh frequency of the second mode.

12. The display panel according to claim 11, wherein the first gate drive group comprises the first-type shift register and two of the second-type shift registers cascaded, the second gate drive group comprises the third-type shift register and two of the second-type shift registers cascaded, and the third gate drive group and the fourth gate drive group each comprise the fourth-type shift register and two of the second-type shift registers cascaded;

the first-type shift register and two of the second-type shift registers in the first gate drive group are connected to three sub-pixel columns of the first odd-numbered pixel column, respectively;

the third-type shift register and two of the second-type shift registers in the second gate drive group are connected to three sub-pixel columns of the first even-numbered pixel column, respectively;

the fourth-type shift register and two of the second-type shift registers in the third gate drive group are connected to three sub-pixel column s of the other odd-numbered pixel column, respectively; and the fourth-type shift register and two of the second-type shift registers in the fourth gate drive group are connected to three sub-pixel columns of the other even-numbered pixel column, respectively.

13. The display panel according to claim 9, wherein each of the pixel columns includes a first sub-pixel column, a second sub-pixel column, and a third sub-pixel column, the first sub-pixel column comprising a plurality of red sub-pixels, the second sub-pixel column comprising a plurality of green sub-pixels, and the third sub-pixel column comprising a plurality of blue sub-pixels; and a direction in which a length of each of the sub-pixels is located intersects a row direction.

* * * * *